(12) United States Patent
Shibutani et al.

(10) Patent No.: US 9,109,104 B2
(45) Date of Patent: Aug. 18, 2015

(54) RESIN COMPOSITION AND MOLDED ARTICLE THEREOF

(75) Inventors: Mitsuo Shibutani, Osaka (JP); Kaoru Inoue, Osaka (JP); Norihito Sakai, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 185 days.

(21) Appl. No.: 13/813,046

(22) PCT Filed: Jul. 28, 2011

(86) PCT No.: PCT/JP2011/067268
§ 371 (c)(1),
(2), (4) Date: Jan. 29, 2013

(87) PCT Pub. No.: WO2012/014981
PCT Pub. Date: Feb. 2, 2012

(65) Prior Publication Data
US 2013/0131270 A1    May 23, 2013

(30) Foreign Application Priority Data
Jul. 30, 2010    (JP) .................................. 2010-171471

(51) Int. Cl.
| C08L 29/02 | (2006.01) |
| C08L 29/04 | (2006.01) |
| C08L 53/00 | (2006.01) |
| C08L 53/02 | (2006.01) |
| C08L 51/08 | (2006.01) |

(52) U.S. Cl.
CPC .............. *C08L 29/04* (2013.01); *C08L 51/08* (2013.01); *C08L 53/02* (2013.01); *C08L 2205/03* (2013.01)

(58) Field of Classification Search
USPC ...................................................... 525/57, 60
See application file for complete search history.

(56) References Cited

U.S. PATENT DOCUMENTS

| 4,272,470 A * | 6/1981 | Hsu et al. ....................... 264/104 |
| 2007/0117901 A1* | 5/2007 | Suzuki et al. ................. 524/442 |

FOREIGN PATENT DOCUMENTS

| JP | 5-78534 | 3/1993 |
| JP | 7-173390 | 7/1995 |
| JP | 10-237299 | 9/1998 |
| JP | 2001-114977 | 4/2001 |
| JP | 2003-277566 | 10/2003 |
| JP | 2004-075866 | 3/2004 |
| JP | 2007-302819 | 11/2007 |

OTHER PUBLICATIONS

Search report from International Application No. PCT/JP2011/067268, mail date is Nov. 1, 2011.

* cited by examiner

*Primary Examiner* — Jeffrey Mullis
(74) *Attorney, Agent, or Firm* — Greenblum & Bernstein, P.L.C.

(57) ABSTRACT

There is provided a resin composition affording a melt-molded article having excellent gas barrier properties and flex crack resistance. The present invention relates to a resin composition comprising a polyvinyl alcohol resin (A) having a 1,2-diol structural unit represented by the following general formula (1), a styrene-based thermoplastic elastomer (B), and a polyamide graft block copolymer (C) containing a polymer block of an aromatic vinyl compound and a polymer block of an olefinic compound in a main chain and having a graft chain composed of a polyamide:

[Chem 1]

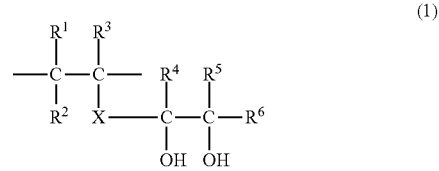

(1)

wherein each of $R^1$, $R^2$, and $R^3$ independently represents a hydrogen atom or an organic group, X represents a single bond or a linking chain, and each of $R^4$, $R^5$, and $R^6$ independently represents a hydrogen atom or an organic group.

5 Claims, No Drawings

RESIN COMPOSITION AND MOLDED ARTICLE THEREOF

TECHNICAL FIELD

The present invention relates to a resin composition comprising a polyvinyl alcohol resin as a main component and having a styrene-based thermoplastic elastomer blended thereto. More particularly, the present invention relates to a resin composition which affords a molded article excellent in flex crack resistance and gas barrier properties and is excellent in melt-viscosity stability during molding and the like through formation of a sea-island structure in which the polyvinyl alcohol resin is a sea component and the styrene-based thermoplastic elastomer is an island component.

BACKGROUND ART

Since polyvinyl alcohol (hereinafter abbreviated as PVA) resins are excellent in gas barrier properties, toughness, transparency, and the like, they are suitable as packaging materials for various articles.

However, since characteristics such as gas barrier properties remarkably change through water absorption and moisture absorption, PVA resins are usually used as one layer of a multilayer structure sandwiched between resin layers excellent in moisture resistance at the use as packaging materials.

In general, as a method for preparing the multilayer structure, a co-extrusion method is suitable in view of production cost and the like but, since melting point is close to decomposition temperature in usual PVA resins, melt molding is substantially impossible. Accordingly, for the production of the multilayer structure having a PVA resin layer, it is unavoidable to adopt a method of converting a PVA resin into an aqueous solution, subsequently casting and drying it to form a film, and then laminating the film with other film(s) or a method of applying the solution on the other film and drying it to form a layer. This limitation has been a large obstacle to wide spread of the PVA resins to packaging material uses.

Ethylene-vinyl alcohol copolymer (EVOH) in which ethylene is introduced into the main chain of PVA resin is melt-moldable and hence has been widely used for various packaging materials. However, since EVOH has slightly poor gas barrier properties as compared with PVA, EVOH is insufficient for uses where higher gas barrier properties are required. Therefore, it is greatly desired to provide a PVA resin excellent in gas barrier properties and melt-moldable.

For such a problem, recently, as a PVA resin melt-moldable and excellent in gas barrier properties, there has been proposed a PVA resin having a 1,2-diol component in the side chain. (See, for example, Patent document 1)

The excellent gas barrier properties of the PVA resins result from high crystallinity, which is also a main cause of the high melting point of the PVA resins. In the PVA resin described in Patent Document 1, the steric hindrance at the side chain lowers the melting point but, on the other hand, the molecular chains are strongly confined by strong hydrogen bonds of the hydroxyl groups in the side-chain 1,2-diol component. Thus, it is assumed that this confinement suppresses degradation of gas barrier properties resulting from the lowered crystallinity.

However, the high crystallinity of the molecular chains and the strong confinement by the hydrogen bonds in the PVA resins cause poor flexibility and impact resistance of the PVA resin as compared with other thermoplastic resins. Although the PVA resin having the 1,2-diol component in the side chain described in Patent document 1 has been also slightly improved by the steric hindrance at the side chain, the resin is still insufficient for practical use.

On the other hand, for the problem of enhancing the flexibility and impact resistance of various resins, there has been widely studied a method of improving the characteristics, without impairing the characteristics of the base resins, by blending a substance having a low elastic modulus and non-compatibility therewith and thus forming a sea-island structure in which the substance forms an island component.

As for PVA resins, there has been proposed a resin composition wherein blending of a styrene-based thermoplastic elastomer therewith results in formation of a sea-island structure in which the PVA resin is a sea component and the styrene-based thermoplastic elastomer is an island component and thus the flexibility and impact resistance are improved. (See, for example, Patent document 2.)

Accordingly, when the improvement of the flexibility and impact resistance has been studied through blending of a styrene-based thermoplastic elastomer with the PVA resin having the 1,2-diol component in the side chain described in Patent Document 1, it has been found that a considerable effect is observed but the blending is still insufficient for satisfying a more advanced requirement. For example, there is a case that when a film obtained from the resin composition is treated under such a severe condition that the film is repeatedly bent, a large number of pinholes are formed and thereby the gas barrier properties are degraded for a moment.

In the case of such a sea-island structure-type polymer alloy, the dispersion state and the interface state of the island component have a large influence on characteristics and, also in the aforementioned case, there are considered such causes that the styrene-based thermoplastic elastomer is not sufficiently micro-dispersed in the PVA resin or the phases are apt to exfoliate each other owing to insufficient affinity between the sea component and the island component and hence insufficient energy transfer at the interface results in insufficient impact absorbability.

For improving the problems, it has been known that combined use of a compatibility accelerator is effective. Since it is necessary for such a compatibility accelerator to have good affinity to both of the sea component and the island component, there has been generally employed one having structural parts that are common to respective components.

For example, in a polymer alloy in which the sea component is a polyamide resin and the island component is a styrene-based thermoplastic elastomer, there has been proposed a resin composition using a styrene-based thermoplastic elastomer to which a polyamide is grafted as a compatibility accelerator. (See, for example, Patent document 3.)

In such Patent Document 3, since the polyamide graft block copolymer used as a compatibility accelerator is common to the island component at the main chain part and is common to the sea component at the graft part, the copolymer has excellent affinity to any of both components. As a result, it is considered that the island component is stably micro-dispersed through localized presence thereof at the interface of the sea-island structure and furthermore impact resistance is improved through good energy transfer at the interface.

RELATED ART

Patent Documents

Patent document 1: JP-A-2004-075866
Patent document 2: JP-A-2001-114977
Patent document 3: JP-A-7-173390

SUMMARY OF INVENTION

Problems to be Solved by the Invention

An object of the present invention is to provide a resin composition which is capable of affording a molded article excellent in flex crack resistance and gas barrier properties and is excellent in melt-viscosity stability during molding and the like.

More specifically, an object thereof is to improve flex crack resistance in a resin composition having gas barrier properties secured through formation of a sea-island structure in which a PVA resin having a 1,2-diol component in the side chain forms a sea component and a styrene-based thermoplastic elastomer forms an island component, with combining the technologies described in Patent Document 1 and Patent Document 2.

For such a problem, combined use of a compatibility accelerator based on the technical concept of Patent Document 3, i.e., a compatibility accelerator having structural parts common to both of the PVA resin as the sea component and the styrene-based thermoplastic elastomer as the island component was studied but it was found that it was difficult to get and synthesize an objective compound because the PVA structure is hydrophilic and the styrene-based thermoplastic elastomer structure is hydrophobic.

In this regard, in the polyamide graft styrene-based thermoplastic elastomer used in Patent Document 3, the resin skeleton is common to the island component but no structure common to the sea component is present and also the polyamide as the graft part is not compatible with the PVA resin as the sea component, so that it is generally considered that any desirable result is obtained even when the elastomer is used.

Means for Solving the Problems

As a result of extensive studies in consideration of the above circumstances, the present inventors have found that the object of the invention is achieved by a resin composition obtained by blending a resin composition comprising a polyvinyl alcohol resin (A) having a 1,2-diol structural unit represented by the following general formula (1) (hereinafter referred to as PVA polymer (A) or PVA resin (A)) and a styrene-based thermoplastic elastomer (B) with a polyamide graft block copolymer (C) containing a polymer block of an aromatic vinyl compound and a polymer block of an olefinic compound in a main chain and having a graft chain composed of a polyamide, and thus they have accomplished the invention:

[Chem 1]

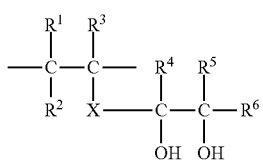

(1)

wherein each of $R^1$, $R^2$, and $R^3$ independently represents a hydrogen atom or an organic group, X represents a single bond or a linking chain, and each of $R^4$, $R^5$, and $R^6$ independently represents a hydrogen atom or an organic group.

It is found that the resin composition of the invention forms a sea-island structure in which the PVA resin (A) having a specific structure is a sea component and the styrene-based thermoplastic elastomer (B) is an island component and furthermore affinity between the phases of the sea component and the island component is unexpectedly improved and thus good results are obtained by blending the polyamide graft block copolymer (C) having a structure common to the island component while not only having no structure common to the sea component but also having a non-compatible polyamide structure in the side chain.

The present invention includes the following embodiments.

[1] A resin composition comprising a polyvinyl alcohol resin (A) having a 1,2-diol structural unit represented by the following general formula (1), a styrene-based thermoplastic elastomer (B), and a polyamide graft block copolymer (C) containing a polymer block of an aromatic vinyl compound and a polymer block of an olefinic compound in a main chain and having a graft chain composed of a polyamide:

[Chem 2]

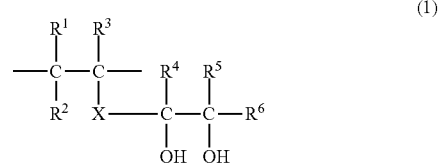

(1)

wherein each of $R^1$, $R^2$, and $R^3$ independently represents a hydrogen atom or an organic group, X represents a single bond or a linking chain, and each of $R^4$, $R^5$, and $R^6$ independently represents a hydrogen atom or an organic group.

[2] The resin composition described in [1], wherein a content ratio (A)/{(B)+(C)} of the polyvinyl alcohol resin (A) to the total of the styrene-based thermoplastic elastomer (B) and the polyamide graft block copolymer (C) is 95/5 to 50/50 as a weight ratio.

[3] The resin composition described in [1] or [2], wherein a content ratio (B)/(C) of the styrene-based thermoplastic elastomer (B) to the polyamide graft block copolymer (C) is 80/20 to 2/98 as a weight ratio.

[4] The resin composition described in any one of [1] to [3], wherein a content of the polyamide component in the polyamide graft block copolymer (C) is 20 to 80 weight %.

[5] The resin composition described in any one of [1] to [4], wherein a ratio $\eta_A/\eta_{B+C}$ of melt viscosity $\eta_A$ of the polyvinyl alcohol resin (A) to melt viscosity $\eta_{B+C}$ of a mixture of the styrene-based thermoplastic elastomer (B) and the polyamide graft block copolymer (C) is 0.5 to 3.

[6] A molded article obtained by melt-molding the resin composition described in any one of [1] to [5].

Effects of the Invention

Since the molded article obtained by melt-molding the resin composition of the present invention has both of excellent gas barrier properties and superior flex crack resistance, the article can be suitably used as films, sheets, and containers for packaging articles for which it is desired to avoid deterioration by oxidation, such as foods and pharmaceuticals, containers, tubes, and hoses for hydrogen gas for which high gas barrier properties and flexibility are required, and the like. Moreover, the resin composition of the invention is excellent in melt-viscosity stability and hence is excellent in stability during molding.

EMBODIMENTS FOR CARRYING OUT THE INVENTION

The following explanation of the constituent elements is one examples (typical example) of the invention, and the invention should not be construed as being limited to the contents.

The resin composition of the invention is a resin composition comprising a polyvinyl alcohol resin (A) having a 1,2-diol structural unit represented by the general formula (1), a styrene-based thermoplastic elastomer (B), and a polyamide graft block copolymer (C) containing a polymer block of an aromatic vinyl compound and a polymer block of an olefinic compound in a main chain and having a graft chain composed of a polyamide The following will explain the elements in order.

[PVA Resin (A)]

First, the PVA resin (A) used in the invention is described.

The PVA resin (A) for use in the inventive resin composition have a 1,2-diol structural unit represented by the following formula (1). In the formula (1), each of $R^1$, $R^2$, and $R^3$ independently represents a hydrogen atom or an organic group, X represents a single bond or a linking chain, and each of $R^4$, $R^5$, and $R^6$ independently represents a hydrogen atom or an organic group.

[Chem 3]

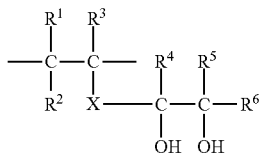

(1)

Particularly, most preferred is one wherein $R^1$ to $R^3$ and $R^4$ to $R^6$ all are a hydrogen atom and X is a single bond in the 1,2-diol structural unit represented by the general formula (1), and a PVA resin having a structural unit represented by the following general formula (1') is suitably used.

[Chem 4]

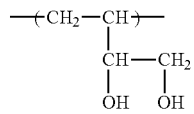

(1')

$R^1$ to $R^3$ and $R^4$ to $R^6$ in the structural unit represented by the general formula (1) may be an organic group within the amount where the resin characteristics are not significantly impaired. Examples of the organic group include alkyl groups having 1 to 4 carbon atoms such as methyl, ethyl, n-propyl, isopropyl, n-butyl, isobutyl, and tert-butyl groups, and these organic groups may have a functional group such as halogen, hydroxyl, ester, carboxylic acid, and sulfonic acid groups, according to necessity.

Moreover, X in the 1,2-diol structural unit represented by the general formula (1) is most preferably a single bond in view of thermal stability and stabilities under high temperature or under acidic conditions. However, X may be a linking chain within the range where the effect of the invention is not inhibited. Such a linking chain includes hydrocarbons such as alkylene, alkenylene, alkynylene, phenylene, and naphthylene (these hydrocarbons may be substituted with halogen(s) such as fluorine, chlorine, and/or bromine), as well as —O—, —$(CH_2O)_m$—, —$(OCH_2)_m$—, —$(CH_2O)CH_2$—, —CO—, —COCO—, —$CO(CH_2)_mCO$—, —$CO(C_6H_4)CO$—, —S—, —CS—, —SO—, —$SO_2$—, —NR—, —CONR—, —NRCO—, —CSNR—, —NRCS—, —NRNR—, —$HPO_4$—, —$Si(OR)_2$—, —$OSi(OR)_2$—, —$OSi(OR)_2O$—, —$Ti(OR)_2$—, —$OTi(OR)_2$—, —$OTi(OR)_2O$—, —Al(OR)—, —OAl(OR)—, —OAl(OR)O— and the like (each R is independently any substituent, preferably a hydrogen atom or an alkyl group, and m is a natural number). Among them, an alkylene group having 6 or less carbon atoms is preferred and methylene group or —$CH_2OCH_2$— is particularly preferred, from the viewpoint of stability in production or in use.

A method of preparing the PVA resin for use in the invention is not particularly limited, but there are preferably used (i) a method of saponifying a copolymer of a vinyl ester monomer and a compound represented by the following general formula (2); (ii) a method of saponifying and decarboxylating a copolymer of a vinyl ester monomer and a compound represented by the following general formula (3); and (iii) a method of saponifying and deketalizing a copolymer of a vinyl ester monomer and a compound represented by the following general formula (4).

[Chem 5]

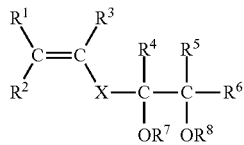

(2)

[Chem 6]

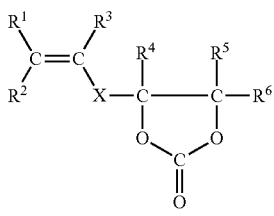

(3)

[Chem 7]

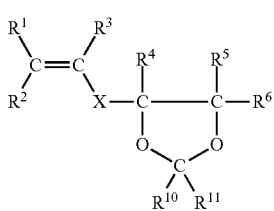

(4)

All of $R^1$, $R^2$, $R^3$, X, $R^4$, $R^5$, and $R^6$ in the above formulae (2), (3), and (4) are the same as in the case of the general formula (1). Moreover, each of $R^7$ and $R^8$ is independently a hydrogen atom or $R^9$—CO— (wherein $R^9$ is an alkyl group having 1 to 4 carbon atoms). Each of $R^{10}$ and $R^{11}$ is independently a hydrogen atom or an alkyl group having 1 to 4 carbon atoms.

Methods explained in JP-A-2006-95825 may be employable for the methods (i), (ii), and (iii).

Of these, in view of excellent copolymerization reactivity and industrial handling, in the method of (i), it is preferred to use 3,4-diacyloxy-1-butene as a compound represented by the general formula (2), and 3,4-diacetoxy-1-butene is particularly preferably used.

In this regard, for example, at the time when vinyl acetate is used as a vinyl ester monomer and it is copolymerized with 3,4-diacetoxy-1-butene, the reactivity ratios of respective monomers are r(vinyl acetate)=0.710 and r(3,4-diacetoxy-1-butene)=0.701. As compared with r (vinyl acetate)=0.85 and r(vinylethylene carbonate)=5.4 in the case of vinylethylene carbonate which is one example of a compound represented by the general formula (3) in the method (ii), it is shown that 3,4-diacetoxy-1-butene is superior in copolymerization reactivity with vinyl acetate.

Also, the chain transfer constant of 3,4-diacetoxy-1-butene is Cx (3,4-diacetoxy-1-butene)=0.003 (65° C.), which shows that elevation of polymerization degree is not inhibited or decrease in the polymerization rate is not caused, as compared with the chain transfer constant of vinylethylene carbonate (Cx (vinylethylene carbonate)=0.005 (65° C.)) or the chain transfer constant of 2,2-dimethyl-4-vinyl-1,3-dioxolane (Cx (2,2-dimethyl-4-vinyl-1,3-dioxolane)=0.023 (65° C.)) which is one example of the compound represented by the general formula (4) used in the method (iii).

Furthermore, a byproduct generated at saponification of the copolymer of 3,4-diacetoxy-1-butene is the same as a compound generated from a structural unit derived from vinyl acetate frequently used as a vinyl ester monomer at saponification. Therefore, it is unnecessary to provide any special equipment or additional steps for post-treatment thereof and/or solvent recovering systems and thus conventional equipments can be used, so that these points are also important industrial advantages.

Incidentally, the above 3,4-diacetoxy-1-butene can be produced by methods of synthesis via an epoxy butene derivative or by the reaction of isomerizing 1,4-diacetoxy-1-butene, which is an intermediate product in the production process of 1,4-butanediol, using a metal catalyst such as palladium chloride, as described in e.g. WO00/24702, U.S. Pat. Nos. 5,623,086, 6,072,079 and so on.

Furthermore, a reagent grade one is commercially available as a product manufactured by Across.

In the case that decarboxylation or deacetalization of the PVA resin obtained by the method (ii) or (iii) is insufficient, a carbonate ring or an acetal ring remains in the side chain. When the PVA resin is melt-molded, the PVA resin may be crosslinked due to the cyclic group, resulting in generation of gel-like matter in some cases.

Accordingly, from this point, the PVA resin obtained by the method (i) is suitably used in the invention.

As the above vinyl ester monomer, there may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzonate, vinyl versatate, and the like, and vinyl acetate is preferably employed from the economic point.

Besides the above-mentioned monomers (vinyl ester monomers and compounds represented by the general formulae (2), (3), and (4)), α-olefins such as ethylene and propylene; hydroxy group-containing α-olefins such as 3-buten-1-ol, 4-penten-1-ol, and 5-hexene-1,2-diol and derivatives thereof such as acylated ones; unsaturated acids such as itaconic acid, maleic acid, and acrylic acid, or salt thereof, mono- or di-alkyl esters thereof; nitriles such as acrylonitrile; amides such as methacrylamide, and diacetone acrylamide; olefin sulfonic acids such as ethylenesulfonic acid, allylsulfonic acid, methallylsulfonic acid, and AMPS or salts thereof, and the like may be copolymerized as copolymerization components, within the range where the resin physical properties are not significantly affected, specifically within 10 mol %.

The saponification degree (measured in accordance with JIS K6726) of the PVA resin (A) for use in the invention is usually 80 to 100 mol %, and one having a saponification degree of particularly 85 to 99.9 mol %, further 87 to 99.5 mol % is preferably used. When the saponification degree is unduly low, melt viscosity becomes unstable during melt-molding, which induces difficulty in stable molding. Moreover, acetic acid odor is generated during molding and the odor is left in the molded article or gas barrier properties of an obtained molded article become insufficient in some cases.

Moreover, the average polymerization degree (measured in accordance with JIS K6726) of the PVA resin (A) is usually 200 to 1800, and one having an average polymerization degree of particularly 300 to 1500, further 300 to 1000 is preferably used.

Also, the melt flow rate (MFR) of the PVA resin (A) at 210° C. and a load of 2160 g is usually 0.5 to 50 g/10 minutes, and one having a melt flow rate of particularly 3 to 20 g/10 minutes, further 5 to 10 g/10 minutes is preferably used. The MFR is measured using "Melt Indexer F-801" manufactured by TOYO SEIKI Co., Ltd.

And, the melt viscosity ($\eta_A$) of the PVA resin (A) at 220° C. and a shear rate of 122 sec$^{-1}$ is usually 100 to 3000 Pa·s, and one having a melt viscosity of particularly 300 to 2000 Pa·s, further 800 to 1500 Pa·s is preferably used. The melt viscosity is measured using "Capillograph 1B" manufactured by TOYO SEIKI Co., Ltd.

When the average polymerization degree is unduly small, when the MFR is unduly large, or when the melt viscosity is unduly small, the obtained molded article may lack in mechanical strength. Contrarily, when the average polymerization degree is unduly large, when the MFR is unduly small, or when the melt viscosity is unduly large, moldability is sometimes deteriorated due to insufficient fluidity, and there is a tendency that shear heat-generation is abnormally induced in molding and thermal decomposition of the resin is likely to occur.

The content of the 1,2-diol structural unit contained in the PVA resin (A) is usually 1 to 15 mol %, and one having a content of particularly 2 to 10 mol %, further 3 to 9 mol % is preferably used. When the content is unduly low, the melting point is elevated up to near the thermal decomposition point, so that scorch, gel, and fish eye caused by thermal decomposition in melt molding are apt to form. Contrarily, when the content is unduly high, adhesion to metal is enhanced, and thereby fluidity is lowered in melt molding, and heat deterioration caused by stagnation is likely to occur.

The content of 1,2-diol structural unit in the PVA resin (A) can be determined based on $^1$H-NMR spectrum (solvent: DMSO-d6, internal standard: tetramethylsilane) of completely saponified PVA resin, and concretely, may be calculated from the areas of peaks derived from hydroxyl group protons, methine protons, and methylene protons in the 1,2-diol unit and methylene protons in the main chain, and protons of hydroxyl groups linked to the main chain.

Moreover, the PVA resin (A) for use in the invention may be one kind thereof or a mixture of two or more kinds thereof. In the case of using a mixture, average values of polymerization degree, saponification degree, and content of the 1,2-diol structural unit and melt viscosity of the mixture fall within the ranges as mentioned above.

Furthermore, it is also possible to use a PVA resin containing no 1,2-diol component in the side chain, e.g., an unmodified PVA in combination as a PVA resin but, in that case, it is preferred that the PVA resin (A) having the 1,2-diol component in the side chain is a main component, specifically contains in an amount of 50 weight % or more, particularly 80 weight % or more based on the total amount of the PVA resins.

[Styrene-based Thermoplastic Elastomer (B)]

Next, a styrene-based thermoplastic elastomer (B) for use in the invention will be explained.

The styrene-based thermoplastic elastomer (B) for use in the invention has a polymer block of an aromatic vinyl compound including, typically, styrene as a hard segment and a polymer block of a conjugated diene compound and/or a block in which part of or all of double bonds remaining in the polymer block are hydrogenated or a polymer block of isobutylene as a soft segment.

As the constitution of the respective blocks in the styrene-based thermoplastic elastomer (B), in the case where the hard segment is shown by X and the soft segment is shown by Y, there may be mentioned a di-block copolymer represented by X—Y, a tri-block copolymer represented by X—Y—X or Y—X—Y, a poly-block copolymer in which Xs and Ys are linked alternately, and the like. Furthermore, as the structure, there may be mentioned a linear chain, a branched chain, a star form, or the like. Particularly, a linear tri-block copolymer represented by X—Y—X is suitable from the viewpoint of mechanical properties.

Monomers to be used for the formation of the polymer block of the aromatic vinyl compound as the hard segment include styrene; alkyl styrenes such as α-methylstyrene, β-methylstyrene, o-methylstyrene, m-methylstyrene, p-methylstyrene, t-butylstyrene, 2,4-dimethylstyrene, and 2,4,6-trimethylstyrene; halogenated styrene such as monofluorostyrene, difluorostyrene, monochlorostyrene, and dichlorostyrene; methoxystyrene; vinyl compounds having an aromatic ring other than a benzene ring such as vinylnaphthalene, vinylanthracene, indene, and acenaphthylene, and derivative thereof. The polymer block of the aromatic vinyl compound may be a homopolymer block of the aforementioned monomer or a copolymer block of a plurality of monomers, but a styrene homopolymer block is suitably used.

The polymer block of the aromatic vinyl compound may be one in which a monomer other than the aromatic vinyl compound is copolymerized in a small amount within the range where the effect of the invention is not inhibited. As the monomer, there may be mentioned olefins such as butene, pentene, and hexene, diene compounds such as butadiene and isoprene, vinyl ether compounds such as methyl vinyl ether, allyl ether compounds, and the like, and the copolymerization ratio is normally 10 mol % or less based on the whole polymer block.

The weight-average molecular weight of the polymer block of the aromatic vinyl compound contained in the styrene-based thermoplastic elastomer (B) is usually 10,000 to 300,000, and one having a weight-average molecular weight of particularly 20,000 to 200,000, further 50,000 to 100,000 is preferably used.

Moreover, monomers to be used for the formation of the polymer block as the soft segment include conjugated diene compounds such as 1,3-butadiene, isoprene (2-methyl-1,3-butadiene), 2,3-dimethyl-1,3-butadiene, and 1,3-pentadiene and isobutylene. They may be used alone or in combination thereof. In particular, homopolymer or copolymer blocks of isoprene, butadiene, and isobutylene are preferred, or especially, a homopolymer block of butadiene or isobutylene is suitably employed.

Incidentally, in the case of the polymer block of the conjugated diene compound, the polymerization may proceed by plural bonding types. For example, in the case of butadiene, a butadiene unit (—$CH_2$—CH(CH=$CH_2$)—) produced by 1,2-bonding and a butadiene unit (—$CH_2$—CH=CH—$CH_2$—) produced by 1,4-bonding are formed. The formation ratio of these is not categorically determined because it is varied depending on kinds of the conjugated diene compound. However, in the case of butadiene, the formation ratio of the 1,2-bonding unit is usually in the range of 20 to 80 mol %.

The polymerization block of the conjugated diene compound can improve thermal resistance and/or weather resistance of the styrene-based thermoplastic elastomer through hydrogenation of part of or all of remaining double bonds in the polymerization block. The hydrogenation percentage is preferably 50 mol % or more, and one having a hydrogenation ratio of particularly 70 mol % or more is preferably used.

By such hydrogenation, the butadiene unit produced by 1,2-bonding of butadiene is converted into a butylene unit (—$CH_2$—CH($CH_2$—$CH_3$)—) and the butadiene unit produced by 1,4-bonding is converted to two sequential ethylene units (—$CH_2$—$CH_2$—$CH_2$—$CH_2$—), but the former is normally formed prior to the latter.

The polymer block as the soft segment may one obtained by copolymerization of a small amount of a monomer other than the aforementioned monomer, within the range where the effect of the invention is not inhibited. Such a monomer includes aromatic vinyl compounds such as styrene, olefins such as butene, pentene, and hexene, vinyl ether compounds such as methyl vinyl ether, allyl ether compounds and the like. The copolymerization ratio thereof is usually 10 mol % or less based on the whole polymer block.

Moreover, the weight-average molecular weight of the polymer block derived from the conjugated diene compound or isobutylene in the styrene-based thermoplastic elastomer (B) is usually 10,000 to 300,000, and one having a weight-average molecular weight of particularly 20,000 to 200,000, further 50,000 to 100,000 is preferably used.

As mentioned above, the styrene-based thermoplastic elastomer (B) for use in the invention comprises the polymer block of an aromatic vinyl compound as a hard segment and a polymer block of a conjugated diene compound or a polymer block in which part of or all of remaining double bonds thereof are hydrogenated, a polymer block of isobutylene, or the like as a soft segment. Representative examples thereof include styrene/butadiene block copolymer (SBS) starting from styrene and butadiene, styrene/butadiene/butylene block copolymer (SBBS) obtained by hydrogenating side-chain double bonds in the butadiene structural unit of SBS, styrene/ethylene/butylene block copolymer (SEBS) obtained by further hydrogenating the main chain double bonds, styrene/isoprene block copolymer (SIPS) starting from styrene and isoprene, styrene/isobutylene block copolymer (SIBS) starting from styrene and isobutylene, and the like. Of these, SEBS and SIBS excellent in thermal stability and weather resistance are preferably used.

The content ratio of the polymer block of the aromatic vinyl compound as the hard segment to the polymer block as the soft segment in the styrene-based thermoplastic elastomer (B) is usually 10/90 to 70/30 as a weight ratio and particularly, a range of 20/80 to 50/50 is suitable. When the content ratio of the polymer block of the aromatic vinyl compound is unduly large or unduly small, there is a case where a balance between flexibility and rubber elasticity of the styrene-based thermoplastic elastomer (B) is disturbed and, as a result, the characteristics of a dry film or the like obtained from the resin composition of the invention become insufficient in some cases.

The styrene-based thermoplastic elastomer (B) can be obtained by producing a block copolymer having a polymer block of an aromatic vinyl compound and a polymer block of a conjugated diene compound or isobutylene and, if necessary, further hydrogenating double bonds in the polymer block of the conjugated diene compound.

First, as a method for producing the block copolymer having a polymer block of an aromatic vinyl compound and a polymer block of a conjugated diene compound or isobutylene, a known method can be used. For example, there may be mentioned a method of sequentially polymerizing the aromatic vinyl compound and the conjugated diene compound or isobutylene in an inert organic solvent using an alkyllithium compound as an initiator, and a similar method.

Then, as a method of hydrogenating the block copolymer having the polymer block of the aromatic vinyl compound and the polymer block of a conjugated diene compound, a known method can be used. For example, there may be mentioned a method of using a reducing agent such as a boron hydride compound, reduction with hydrogen using a metal catalyst such as platinum, palladium, or Raney nickel, and a similar method.

The weight-average molecular weight of the styrene-based thermoplastic elastomer (B) for use in the invention is usually 50,000 to 500,000, and one having a weight-average molecular weight of particularly 120,000 to 450,000, further 150,000 to 400,000 is preferably used.

Furthermore, the melt viscosity ($\eta_B$) of the styrene-based thermoplastic elastomer (B) at 220° C. and a shear rate of 122 $sec^{-1}$ is usually 100 to 3000 Pa·s, and one having a melt viscosity of particularly 300 to 2000 Pa·s, further 800 to 1500 Pa·s is preferably used.

When the weight-average molecular weight is unduly large or when the melt viscosity is unduly high, workability in melt kneading with the PVA resin (A), or dispersibility in the PVA resin (A) may be lowered in some cases. Contrarily, when the weight-average molecular weight is unduly small or when the melt viscosity is unduly low, characteristics of the resin composition of the invention and the molded article thereof become insufficient in some cases.

The weight-average molecular weight of the styrene-based thermoplastic elastomer (B) is a value determined by means of GPC using polystyrene as a standard.

Moreover, in the invention, as the aforementioned styrene-based thermoplastic elastomer (B), one kind thereof may be used but it is also possible to use a plurality of them after suitably mixed for the purpose of obtaining desired characteristics. In that case, the melt viscosity of the mixture preferably falls within the aforementioned range.

Examples of commercially available products of the styrene-based thermoplastic elastomer (B) include "TUFPRENE", "ASAPRENE T", and "ASAFLEX" as SBS manufactured by Asahi Kasei Corporation, "TAFTEC P series" as SBBS manufactured by Asahi Kasei Corporation, and "TAFTEC H series" as SEBS manufactured by Asahi Kasei Corporation, "SIBSTAR" as SIBS manufactured by Kaneka Corporation, and the like.

As other commercially available products, there may be mentioned "Kraton G", "Kraton D", and "Cariflex TR" manufactured by Shell Japan; "SEPTON" and "HYBRAR" manufactured by Kuraray Co., Ltd.; "DYNARON®", "JSR-TR", and "JSR-SIS" manufactured by JSR Corporation; "Quintac(R)" manufactured by Zeon Corporation; "DENKA STR" manufactured by Denki Kagaku Kogyo Kabushiki Kaisha; and the like.

[Polyamide Graft Block Copolymer (C)]

Next, the polyamide graft block copolymer (C) for use in the invention will be explained.

The polyamide graft block copolymer (C) contains a polymer block of an aromatic vinyl compound and a polymer block of an olefinic compound in a main chain and has graft chains composed of polyamide.

First, the block copolymer containing a polymer block of an aromatic vinyl compound and a polymer block of an olefin compound, which constitutes the main chain of the polyamide graft block copolymer (C), will be explained.

The block copolymer has a polymer block of an aromatic vinyl compound represented by styrene as a hard segment and a polymer block of an olefin compound such as a polymer block of a conjugated diene compound and/or a block in which part of or all of double bonds remaining in the polymer block are hydrogenated or a polymer block of isobutylene as a soft segment, as in the case of the styrene-based thermoplastic elastomer (B).

The block configuration of the block copolymers, the hard segment, the soft segment, the content ratio thereof, and the like are all selected from those exemplified in the explanation of the styrene-based thermoplastic elastomer (B) and preferable ranges. The structure and the like may be the same as or different from those of the styrene-based thermoplastic elastomer (B) but is preferably the same from the viewpoint of affinity between them.

The polyamide graft block copolymer (C) of the invention has the aforementioned block copolymer as a main chain and has graft chains composed of a polyamide bonded thereto. As a method for introducing the graft chains composed of a polyamide into the main chain of the block copolymer, a known grafting reaction can be used but particularly, using a block copolymer having a carboxylic acid group or a derivative group thereof, a method of utilizing a reaction of the carboxylic (derivative) group with a terminal amino group of the polyamide is preferably used.

As a method of introducing the carboxylic acid group or the derivative group thereof into the side chain of the block copolymer containing the polymer block of the aromatic vinyl compound and the polymer block of the olefin compound in the main chain, a method through copolymerization and a method through a post reaction may be mentioned and particularly, a method of adding an α,β-unsaturated carboxylic acid or its derivative to the block copolymer through a post reaction is preferably used. As such an addition reaction, there may be mentioned a radical reaction in a solution in the presence or absence of a radical initiator, a method of melt kneading in an extruder, and the like.

As the α,β-unsaturated carboxylic acid or its derivative to be used for the introduction of the carboxylic acid group or its derivative group, there may be mentioned α,β-unsaturated monocarboxylic acids such as acrylic acid and methacrylic acid; α,β-unsaturated dicarboxylic acids such as maleic acid, succinic acid, itaconic acid, and phthalic acid; α,β-unsaturated monocarboxylic acid esters such as glycidyl acrylate, glycidyl methacrylate, hydroxylethyl acrylate, and hydroxylmethyl methacrylate; α,β-unsaturated dicarboxylic acid anhydrides such as maleic anhydride, succinic anhydride, itaconic anhydride, and phthalic anhydride, and the like.

As the content of the carboxylic acid group or its derivative group introduced into the block copolymer by the above method or the like, an acid value measured by a titration method is usually 0.5 to 20 mg $CH_3ONa/g$, and the block copolymer having an acid value of particularly 1 to 10 mg $CH_3ONa/g$, further 2 to 5 mg $CH_3ONa/g$ is preferably used. When the content of the carboxylic acid group (derivative group) is unduly large, the amount of the carboxylic acid group (derivative group) remaining without being involved in the reaction with the polyamide increases and there is a tendency that the resin viscosity increases during melt kneading or molding. When the content is unduly small, it becomes difficult to introduce the polyamide sufficiently by grafting.

As commercially available products of the block copolymers having the carboxylic acid group or its derivative group, for example, "TUFTEC M Series", which are carboxyl group-modified products of SBS, manufactured by Asahi Kasei Corporation, "f-DYNARON" manufactured by JSR Corporation, and "KRATON FG" manufactured by Shell Japan, and the like may be mentioned.

Next, the polyamide that forms the graft chains in the polyamide graft block copolymer (C) of the invention will be explained.

In the polyamide, structural units are linked with an amide bond and the polyamide is obtained by polycondensation of a diamine with a dicarboxylic acid, self-condensation of an ω-amino acid, a ring-opening polymerization of a lactam, or polycondensation/ring-opening polymerization of a diamine and a dicarboxylic acid, and a lactam, and has an amino group in at least one terminal end thereof.

The diamine may include aliphatic diamines such as trimethylenediamine, tetramethylenediamine, pentamethylenediamine, hexamethylenediamine, 2,2,4- or 2,4,4-trimethylhexamethylenediamine, and octamethylenediamine and aromatic diamines such as phenylenediamines and xylylenediamines.

The dicarboxylic acid may include aromatic dicarboxylic acids such as isophthalic acid and terephthalic acid, alicyclic dicarboxylic acids such as cyclohexane-1, 4 or 1,3-dicarboxylic acid, aliphatic dicarboxylic acids such as sebacic acid, octadecanedioic acid, suberic acid, glutaric acid, pimelic acid, and adipic acid.

These diamines and dicarboxylic acids may be used alone or two or more thereof may be used in combination.

Furthermore, the lactam may include butyrolactam, pivalolactam, caprolactam, caprylolactam, enantholactam, undecanolactam, dodecanolactam, and the like. These lactams may be used alone or two or more thereof may be used in combination.

Representative polyamides may include ring-opened polymers of lactams, such as polycaprolactam (Nylon 6), polyheptolactam (Nylon 7), polycaprylolactam (Nylon 8), polynonanolactam (Nylon 9), polyundecanolactam (Nylon 11), and polylaurylolactam (Nylon 12); ring-opened copolymers of lactams, such as caprolactam/laurylolactam copolymer (Nylon 6/12) and caprolactam/nonanolactam copolymer (Nylon 6/9); polycondensates of diamines with dicarboxylic acids, such as polyethylenediamineadipamide (Nylon 26), polytetramethyleneadipamide (Nylon 46), polyhexamethyleneadipamide (Nylon 66), polyhexamethylenesebacamide (Nylon 610), polyhexamethylenedodecamide (Nylon 612), polyoctamethyleneadipamide (Nylon 86), polydecamethyleneadipamide (Nylon 106), polydecamethylenesebacamide (Nylon 108), and ethylenediamineadipamide/hexamethyleneadipamide copolymer (Nylon 26/66); copolymers of lactams/diamines/dicarboxylic acids, such as caprolactam/hexamethyleneadipamide copolymer (Nylon 6/66), laurylolactam/hexamethyleneadipamide copolymer (Nylon 12/66), caprolactam/hexamethyleneadipamide/hexamethylenediammonium sebacate copolymer (Nylon 66/610), and ethyleneammonium adipate/hexamethyleneadipamide/hexamethylenediammonium sebacate copolymer (Nylon 6/66/610); and the like, and mixtures thereof can be also employed.

The weight-average molecular weight of the polyamide for use in the invention is usually 8,000 to 35,000, and one having a weight-average molecular weight of particularly 23,000 to 32,000, especially 25,000 to 30,000 is preferably used. When the weight-average molecular weight is unduly large, fluidity during thermal melt-molding tends to decrease. Contrarily, when it is unduly small, there is a tendency that the effect of the invention is not sufficiently obtained.

The content of the polyamide in the polyamide graft block copolymer (C) for use in the invention is usually 20 to 80 weight %, and one having a content of particularly 30 to 70 weight %, further 35 to 50 weight % is preferably used. When the content of the polyamide is unduly large or unduly small, the film-making state by melt molding becomes defective, so that pinhole resistance tends to decrease.

The reaction of grafting the polyamide to the block copolymer having the polymer block of the aromatic vinyl compound and the polymer block of the olefin compound as the main chain and having the carboxylic acid group or its derivative group in the side chain is a reaction of the carboxylic acid (derivative) group with the amino group of the polyamide terminal end and can be carried out in a solution or as a solid-phase reaction with no solvent. In particular, since removal of the solvent after the reaction is unnecessary, there is preferably used a method in which the block copolymer and the polyamide are all made a melted state and they are reacted with kneading.

Apparatus for use in the melt kneading includes a kneading machine, an extruder, a mixing roll, a Banbury mixer, a kneader, and the like. Particularly, from the viewpoints that continuous processing is possible, mixing efficiency is excellent, and pellet products excellent in handling properties in successive steps can be easily obtained, an extruder is suitable.

In the melt kneading, there may be mentioned a method of making one of the materials to be used a melted state, adding the other one thereto, and subsequently kneading them, a method of dry-blending both materials, charging them into an apparatus, and melt-kneading them, and a similar method and the method may be suitably selected depending on the apparatus to be used. Particularly, in the case where an extruder is used, a method of dry blending beforehand is preferably used.

As conditions for melt kneading using the extruder to obtain the polyamide graft block copolymer (C) of the invention, it is necessary to suitably control the conditions depending on the melting point and the like of the material to be used but the process is usually conducted at 190 to 250° C., and a range of particularly 200 to 230° C., further 210 to 220° C. is preferably employed.

Moreover, it is necessary to vary the residential time in the extruder depending on the volume, temperature, and the like of the extruder but the process is conducted in the range of usually 2 to 10 minutes, particularly 3 to 5 minutes.

The melt viscosity ($\eta_C$) at 220° C. and a shear viscosity of 122 sec$^{-1}$ of the polyamide graft block copolymer (C) obtained by the method is usually 500 to 5000 Pa·s, and one having a melt viscosity of particularly 1000 to 4000 Pa·s, further 2000 to 3000 Pa·s is preferably used. When the melt viscosity is unduly large, shear heat-generation increases in the melt molding and thermal decomposition tends to easily occur. Contrarily, when it is unduly small, uniformity of dispersion decreases in the melt kneading and, as a result, the effect of the invention tends to decrease.

[Resin Composition]

The resin composition of the invention is a resin composition obtained by blending a resin composition comprising a PVA resin (A) having a 1,2-diol structural unit represented by the aforementioned general formula (1) and a styrene-based thermoplastic elastomer (B) with a polyamide graft block copolymer (C) containing a polymer block of an aromatic vinyl compound and a polymer block of an olefinic compound in a main chain and having a graft chain composed of a polyamide.

A content ratio (A)/{(B)+(C)} (weight ratio) of the PVA resin (A) to the total of the styrene-based thermoplastic elastomer (B) and the polyamide graft block copolymer (C) in the resin composition of the invention is usually 95/5 to 50/50 as a weight ratio, and a range of particularly 90/10 to 55/45, further 85/15 to 60/40 is preferably used. When the content ratio is unduly large, there is a case where sufficient flex crack resistance is not obtained when the composition is transformed into a molded article. Contrarily, when the ratio is unduly small, gas barrier properties tend to be insufficient.

Moreover, the content ratio (B)/(C) (weight ratio) of the styrene-based thermoplastic elastomer (B) to the polyamide graft block copolymer (C) in the resin composition of the invention is usually 90/10 to 2/98, and a range of particularly 75/25 to 10/90, further 65/35 to 40/60 is preferably used. When the content ratio is unduly large or unduly small, flex crack resistance tends to be insufficient.

Moreover, the ratio $\eta_A/\eta_{B+C}$ of the melt viscosity $\eta_A$ of the PVA resin (A) to the melt viscosity $\eta_{B+C}$ of mixture of the styrene-based thermoplastic elastomer (B) and the polyamide graft block copolymer (C) is usually 0.5 to 3, and a range of particularly 0.6 to 2, further 0.8 to 1.2 is preferably used. When the melt viscosity ratio is unduly large or unduly small, there is a case where these materials cannot be homogeneously mixed at the time when the resin composition of the invention is prepared by melt kneading of the materials.

Incidentally, the melt viscosity $\eta_{B+C}$ of mixture of the styrene-based thermoplastic elastomer (B) and the polyamide graft block copolymer (C) is a value at 220° C. and a shear rate of 122 sec$^{-1}$, which is obtained using "Capillograph 1B" manufactured by TOYO SEIKI Co., Ltd.

The resin composition of the invention may contain other polymers within the range where the effect of the invention is not inhibited. Examples of the containable polymers include various thermoplastic resins such as general PVA besides the aforementioned PVA polymer, various modified PVA resins, vinyl alcohol resins such as ethylene-vinyl alcohol copolymers, polyamides, polyesters, polyethylene, polypropylene, and polystyrene.

Moreover, the resin composition may contain, according to necessity, a reinforcing agent, a filler, a plasticizer, a pigment, a dye, a lubricant, an antioxidant, an antistatic agent, an ultraviolet absorber, a thermal stabilizer, a light stabilizer, a surfactant, an antibacterial agent, an antistatic agent, a drying agent, an antiblocking agent, a fire retardant, a crosslinking agent, a curing agent, a blowing agent, a crystal nucleating agent, and other thermoplastic resins, within the range where the effect of the invention is not inhibited.

The resin composition of the invention can be prepared by a method and apparatus usually used for mixing polymeric substances, and particularly, a method by melt-kneading is preferably employed. As such a melt-kneading apparatus, a kneading machine, an extruder, a mixing roll, a banbury mixer, a kneader, and the like may be mentioned, and a method using the extruder, which is capable of continuous processing and is excellent in mixing efficiency, is suitable.

As for melt kneading using the extruder to obtain the resin composition of the invention, it is necessary to suitably control the conditions depending on the melting point and the like of the material to be used but the process is usually conducted at 190 to 250° C., and a range of particularly 200 to 230° C., further 210 to 220° C. is preferably employed.

Moreover, it is necessary to vary the residential time in the extruder depending on the volume, temperature, and the like of the extruder but the process is conducted in the range of usually 2 to 10 minutes, particularly 3 to 5 minutes.

The resin composition of the invention obtained by such mixing is usually obtained in the form of pellets or powder, for use as a molding material. Particularly, the pellet form is preferable in view of charging into a molding machines, handling, and only a little problem of generation of fine powder.

In the molding into the pellet form, known methods can be used but it is efficient to use a method of extruding the resin composition in a strand form from the above extruder and, after cooling, cutting the strand in a predetermined length to obtain cylindrical pellets.

[Molded Article]

The resin composition of the invention is suitable for a molding material due to excellent moldability, particularly excellent melt moldability. As melt-molding methods, known molding methods such as extrusion molding, inflation molding, injection molding, blow molding, vacuum forming, pressure forming, compression molding, and calendar molding can be employed.

Moreover, as molded articles obtained from the resin composition of the invention, there may be mentioned variously shaped molded articles such as films, sheets, pipes, plates, rings, bags, bottles, and fabrics.

Furthermore, it is also possible to form a multilayer structure of a layer composed of the resin composition of the invention and a layer of other material.

Particularly, the resin composition of the invention contains the PVA resin as a main component and has excellent gas barrier properties under low humidity conditions. However, since there is a case where the properties may be strongly influenced by humidity absorption, it is desirable to use the resin composition as a multilayer structure in which a material having high moisture barrier properties is provided on the surface.

Examples of the material having high moisture barrier properties include thermoplastic resins including, typically, polyolefin-based resins such as low density polyethylene, medium density polyethylene, high density polyethylene, ethylene-vinyl acetate copolymer, ethylene-propylene copolymer, and polypropylene, polyester resins such as polyethylene terephthalate and polybutylene terephthalate, vinyl chloride resins such as polyvinyl chloride and polyvinylidene chloride, and polyamide resins such as Nylon; thermosetting resins such as epoxy resins and phenol resins; metals and deposited films of various metals; and the like. These materials may be selected depending on applications thereof or desired characteristics.

In the multilayer structure, an adhesive layer may be interposed between the layer composed of the resin composition of the invention and the layer composed of other materials. Examples of the adhesive to be used for the adhesive layer includes modified olefin-based polymers containing a carboxyl group, such as maleic anhydride-modified polyethylene, maleic anhydride-modified polypropylene, and maleic anhydride-modified ethylene-vinyl acetate copolymers, and the like.

As methods for forming the multilayer structure, in the case of lamination with a thermoplastic resin, coextrusion, coinjection, or the like can be employed. As the other methods, various methods such as extrusion coating and a method of producing individual layers in advance and laminating them can be adopted depending on desired shape, thickness, and the like.

Since a molded article composed of the resin composition of the invention has excellent barrier properties against various gases and further has excellent flexibility and flex crack resistance, it can be used for articles where these characteristics are required. Such use examples include packaging materials for foods and drinks, containers, inner bags for bag in box-type containers, packing for containers, infusion solution bags for medical use, containers for organic liquids, pipes for organic liquid transportation, containers for various gases, tubes, hoses, and the like.

Furthermore, it is also possible to use it for various electrical parts, automobile parts, industrial components, leisure goods, sporting goods, articles for daily use, toys, medical equipments, and the like.

EXAMPLES

The following will explain the present invention with reference to Examples, but the invention is not limited to the description unless exceeding its gist.

Incidentally, "parts" and "%" in Examples are on the weight basis, unless otherwise indicated.

Production Example 1

[Production of PVA Resin (A1)]

In a reaction vessel equipped with a reflux condenser, a dropping funnel, and a stirrer, 68.0 parts of vinyl acetate, 23.8 parts of methanol, and 8.2 parts of 3,4-diacetoxy-1-butene were placed. Then, 0.3 mol % (based on the amount of employed vinyl acetate) of azobisisobutyronitrile was added, and the temperature was raised with stirring under a nitrogen stream, thus, initiating polymerization. When the polymerization degree of vinyl acetate reached 90%, m-dinitrobenzene was added thereto to terminate the polymerization. Successively, unreacted vinyl acetate monomer was removed to outside the system by a method of blowing methanol vapor into the system, thereby forming a methanol solution of a copolymer.

Then, the above methanol solution was further diluted with methanol to adjust the concentration to 45% and then was provided in a kneader. While keeping the solution temperature at 35° C., a 2% methanol solution of sodium hydroxide was added thereto in such a ratio as to be 10.5 mmol relative to 1 mol of the total amount of the vinyl acetate structural unit and the 3,4-diacetoxy-1-butene structural unit in the copolymer, thereby performing saponification. As the saponification proceeded, a saponification product was precipitated. When the product became in the form of particles, the product was separated by filtration and then was washed thoroughly with methanol and dried in a hot-air dryer to prepare an objective PVA resin (A1).

The saponification degree of the obtained PVA resin (A1) was 98.9 mol % when analyzed based on the residual vinyl acetate and the consumed amount of the alkali required for hydrolysis of 3,4-diacetoxy-1-butene. The average degree of polymerization was 450 when analyzed in accordance with JIS K 6726. The content of the 1,2-diol structural unit shown by the formula (1) was 6 mol %, when calculated from the integral value obtained by $^1$H-NMR (300 MHz proton NMR, d6-DMSO solution, internal standard substance: tetramethylsilane, 50° C.). The MFR (210° C., load: 2160 g) was 5.5 g/10 minutes, and the melt viscosity (220° C., shear rate: 122 sec$^{-1}$) was 1278 Pa·s.

Production Example 2

[Production of PVA Resin (A2)]

In a reaction vessel equipped with a reflux condenser, a dropping funnel, and a stirrer 30.1 parts (40% of total amount to be added) of vinyl acetate, 15.8 parts of methanol, and 3.6 parts (40% of total amount to be added) of 3,4-diacetoxy-1-butene were placed. Then, 0.067 mol % (based on the total amount of vinyl acetate to be added) of azobisisobutyronitrile was added, and the temperature was raised with stirring under a nitrogen stream, thus, initiating polymerization.

Furthermore, while 45.1 parts (60% of total amount to be added) of vinyl acetate and 5.4 parts (60% of total amount to be added) of 3,4-diacetoxy-1-butene were added dropwise at a constant speed over a period of 15 hours, the polymerization was continued.

When the polymerization degree of vinyl acetate reached 90%, m-dinitrobenzene was added thereto to terminate the polymerization. Successively, unreacted vinyl acetate monomer was removed to outside the system by a method of blowing methanol vapor into the system, thereby forming a methanol solution of a copolymer.

Then, the methanol solution was further diluted with methanol to adjust the concentration to 55% and then was provided in a kneader. While keeping the solution temperature at 35° C., a 2% methanol solution of sodium hydroxide was added thereto in such a ratio as to be 3.5 mmol relative to 1 mol of the total amount of the vinyl acetate structural unit and the 3,4-diacetoxy-1-butene structural unit in the copolymer, thereby performing saponification. As the saponification proceeded, a saponification product was precipitated. When the product became in the form of particles, the product was separated by filtration and then was washed thoroughly with methanol and dried in a hot-air dryer to prepare an objective PVA resin (A2).

The saponification degree of the obtained PVA resin (A2) was 88.0 mol % when analyzed based on the residual vinyl acetate and the consumed amount of the alkali required for hydrolysis of 3,4-diacetoxy-1-butene. The average degree of polymerization was 450 when analyzed in accordance with JIS K 6726. The content of the 1,2-diol structural unit shown by the formula (1) was 6 mol % when calculated from the integral value obtained by $^1$H-NMR (300 MHz proton NMR, d6-DMSO solution, internal standard substance: tetramethylsilane, 50° C.). The MFR (210° C., load: 2160 g) was 6.0 g/10 minutes, and the melt viscosity (220° C., shear rate: 122 sec$^{-1}$) was 1205 Pa·s.

Production Example 3

[Production of Polyamide Graft Block Copolymer (C1)]

Ten weight parts of "TAFTEC M1911" (manufactured by Asahi Kasei Corporation, styrene/ethylene-butylene=30/70 (weight ratio), acid value: 2 mgCH$_3$ONa/g, melt viscosity: 1223 Pa·s (220° C., shear rate: 122 sec$^{-1}$)) as a styrene/ethylene/butylene block copolymer having a carboxylic acid group and 7 weight parts of Nylon (6/66) (manufactured by Mitsubishi Chemical Corporation, Novamid 2420J, weight-average molecular weight: 28,000) were dry-blended, which was then melt-kneaded under the following conditions in a twin-screw extruder, extruded in a strand form, and cut with a pelletizer, thus, obtaining a cylindrical pellet-form polyamide graft block copolymer (C1).

The polyamide content of the polyamide graft block copolymer (C1) was 41 weight % and the melt viscosity at 220° C. and a shear rate of 122 sec$^{-1}$ was 2132 Pa·s.

Twin-Screw Extruder
diameter (D) 15 mm,
L/D=60
Rotation number of screw: 200 rpm
Set temperature: C1/C2/C3/C4/C5/C6/C7/C8/D=90/205/210/210/210/215/220/220/220° C.
Output: 1.5 kg/hr Production Example 4

[Production of Polyamide Graft Block Copolymer (C2)]
A polyamide graft block copolymer (C2) was obtained in the same manner as in Production Example 3 except that the amount of Nylon (6/66) was changed to 5 weight parts in Production Example 3.
The polyamide content of the polyamide graft block copolymer (C2) was 33 weight % and the melt viscosity at 220° C. and a shear rate of 122 sec$^{-1}$ was 2138 Pa·s.

Production Example 5

[Production of Polyamide Graft Block Copolymer (C3)]
A polyamide graft block copolymer (C3) was obtained in the same manner as in Production Example 3 except that the amount of Nylon (6/66) was changed to 10 weight parts in Production Example 3.
The polyamide content of the polyamide graft block copolymer (C3) was 50 weight % and the melt viscosity at 220° C. and a shear rate of 122 sec$^{-1}$ was 2554 Pa·s.

Production Example 6

[Production of Polyamide Graft Block Copolymer (C4)]
A polyamide graft block copolymer (C4) was obtained in the same manner as in Production Example 3 except that "TAFTEC M1913" (manufactured by Asahi Kasei Corporation, styrene/ethylene-butylene=30/70 (weight ratio), acid value: 10 mgCH$_3$ONa/g, melt viscosity: 1200 Pa·s (220° C., shear rate: 122 sec$^{-1}$)) was used as a styrene/ethylene/butylene block copolymer having a carboxylic acid group and the amount of Nylon (6/66) was changed to 35 weight parts in Production Example 3.
The polyamide content of the polyamide graft block copolymer (C4) was 78 weight % and the melt viscosity at 220° C. and a shear rate of 122 sec$^{-1}$ was 4520 Pa·s.

Example 1

[Production of Resin Composition]
Eighty weight parts of the PVA resin (A1) obtained in Production Example 1, 10 weight parts of "TAFTEC H1041" (manufactured by Asahi Kasei Corporation, styrene/ethylene/butylene block copolymer (SEBS), styrene/ethylene-butylene=30/70 (weight ratio), melt viscosity: 1372 Pa·s (220° C., shear rate: 122 sec$^{-1}$)), and 10 weight parts of the polyamide graft block copolymer (C1) obtained in Production Example 3 were dry-blended, which was then melt-kneaded under the following conditions in a twin-screw extruder, extruded in a strand form, and cut with a pelletizer, thus, obtaining a cylindrical pellet-form resin composition.
On this occasion, the melt viscosity of the mixture of the styrene-based thermoplastic elastomer (B) and the polyamide graft block copolymer (C1) at 220° C. and a shear rate of 122 sec$^{-1}$ was 1457 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 0.88.

Twin-screw extruder
Diameter (D) 15 mm,
L/D=60
Rotation number of screw: 200 rpm
Set temperature: C1/C2/C3/C4/C5/C6/C7/C8/D = 90/205/210/210/210/215/220/220/220° C.
Output: 1.5 kg/hr

[Preparation of Molded Article]
The obtained pellets were formed into a film in an extruder under the following conditions to prepare a single layer film having a thickness of about 30 μm, and the following evaluation was performed.
Diameter (D) 15 mm,
L/D=60
Rotation number of screw: 200 rpm
Set temperature: C1/C2/C3/C4/C5/C6/C7/C8/D = 90/205/210/210/210/215/220/220/220° C.
Output: 1.5 kg/hr
Die: width 300 mm, coat hanger type
Drawn speed: 2.6 m/min
Roll temperature: 50° C.
Air gap: 1 cm
(Flex Crack Resistance)
A torsion stress test was conducted using a gelbo flex tester (manufactured by Rigakukogyo-sha) under the conditions of 23° C. and 50% RH.
After a sample was driven to move in the horizontal direction by 25 inches, torsion stress of 440° at 3.5 inches was applied for 100 times (40 cycles/min) and then, the number of pinholes generated in an area of 28 cm×17 cm located at the central portion of the single layer film was counted. The results were summarized in Table 1.

Example 2

Pellets of the resin composition of the invention were prepared in the same manner as in Example 1 except that the polyamide graft block copolymer (C2) obtained in Production Example 4 was used as the polyamide graft block copolymer (C) in Example 1.
On this occasion, the melt viscosity of the mixture of the styrene-based thermoplastic elastomer (B) and the polyamide graft block copolymer (C2) at 220° C. and a shear rate of 122 sec$^{-1}$ was 1299 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 0.98.
Using the obtained pellets of the resin composition, a single layer film was obtained in the same manner as in Example 1 and evaluation was similarly performed. The results were summarized in Table 1.

Example 3

Pellets of the resin composition of the invention were prepared in the same manner as in Example 1 except that the polyamide graft block copolymer (C3) obtained in Production Example 5 was used as the polyamide graft block copolymer (C) in Example 1.
On this occasion, the melt viscosity of the mixture of the styrene-based thermoplastic elastomer (B) and the polyamide graft block copolymer (C3) at 220° C. and a shear rate of 122 sec$^{-1}$ was 1452 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 0.88.

Using the obtained pellets of the resin composition, a single layer film was obtained in the same manner as in Example 1 and evaluation was similarly performed. The results were summarized in Table 1.

Example 4

Pellets of the resin composition of the invention were prepared in the same manner as in Example 1 except that the polyamide graft block copolymer (C4) obtained in Production Example 6 was used as the polyamide graft block copolymer (C) in Example 1.

On this occasion, the melt viscosity of the mixture of the styrene-based thermoplastic elastomer (B) and the polyamide graft block copolymer (C4) at 220° C. and a shear rate of 122 sec$^{-1}$ was 4520 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 0.28.

Using the obtained pellets of the resin composition, a single layer film was obtained in the same manner as in Example 1 and evaluation was similarly performed. The results were summarized in Table 1.

Comparative Example 1

Pellets of the resin composition of the invention were produced in the same manner as in Example 1 except that the amount of the styrene-based thermoplastic elastomer (B) was changed to 20 weight parts and the polyamide graft block copolymer (C1) was not blended in Example 1, and a single layer film was similarly obtained and evaluation was similarly performed. The results were summarized in Table 1.

TABLE 1

| | Flex crack resistance (number of pinholes) |
|---|---|
| Example 1 | 45 |
| Example 2 | 70 |
| Example 3 | 62 |
| Example 4 | 83 |
| Comparative Example | 185 |

As is apparent from the results, molded articles all having excellent flex crack resistance were obtained from the resin compositions of Examples 1 to 4 in which the polyamide graft block copolymer (C) was used in combination relative to Comparative Example 1 in which only the styrene-based thermoplastic elastomer (B) was used.

Example 5

Pellets of the resin composition of the invention were prepared in the same manner as in Example 1 except that the amount of the styrene-based thermoplastic elastomer (B) was changed to 16 weight parts and the amount of the polyamide graft block copolymer (C1) was changed to 4 weight parts in Example 1.

On this occasion, the melt viscosity of the mixture of the styrene-based thermoplastic elastomer (B) and the polyamide graft block copolymer (C1) at 220° C. and a shear rate of 122 sec$^{-1}$ was 1193 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 1.1.

Using the obtained pellets of the resin composition, a single layer film was obtained in the same manner as in Example 1 and evaluation was similarly performed. The results were summarized in Table 2.

Example 6

Pellets of the resin composition of the invention were prepared in the same manner as in Example 1 except that the amount of the styrene-based thermoplastic elastomer (B) was changed to 14 weight parts and the amount of the polyamide graft block copolymer (C1) was changed to 6 weight parts in Example 1.

On this occasion, the melt viscosity of the mixture of the styrene-based thermoplastic elastomer (B) and the polyamide graft block copolymer (C1) at 220° C. and a shear rate of 122 sec$^{-1}$ was 1280 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 1.0.

Using the obtained pellets of the resin composition, a single layer film was obtained in the same manner as in Example 1 and evaluation was similarly performed. The results were summarized in Table 2.

Example 7

Pellets of the resin composition of the invention were prepared in the same manner as in Example 1 except that the amount of the styrene-based thermoplastic elastomer (B) was changed to 12 weight parts and the amount of the polyamide graft block copolymer (C1) was changed to 8 weight parts in Example 1.

On this occasion, the melt viscosity of the mixture of the styrene-based thermoplastic elastomer (B) and the polyamide graft block copolymer (C1) at 220° C. and a shear rate of 122 sec$^{-1}$ was 1369 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 0.93.

Using the obtained pellets of the resin composition, a single layer film was obtained in the same manner as in Example 1 and evaluation was similarly performed. The results were summarized in Table 2.

Example 8

Pellets of the resin composition of the invention were prepared in the same manner as in Example 1 except that the amount of the styrene-based thermoplastic elastomer (B) was changed to 6 weight parts and the amount of the polyamide graft block copolymer (C1) was changed to 14 weight parts in Example 1.

On this occasion, the melt viscosity of the mixture of the styrene-based thermoplastic elastomer (B) and the polyamide graft block copolymer (C1) at 220° C. and a shear rate of 122 sec$^{-1}$ was 1635 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 0.78.

Using the obtained pellets of the resin composition, a single layer film was obtained in the same manner as in Example 1 and evaluation was similarly performed. The results were summarized in Table 2.

TABLE 2

| | Flex crack resistance (number of pinholes) |
|---|---|
| Example 1 | 45 |
| Example 5 | 90 |
| Example 6 | 66 |
| Example 7 | 49 |
| Example 8 | 73 |

These Examples were performed with varying the blend ratio of the styrene-based thermoplastic elastomer (B) to the polyamide graft block copolymer (C), and molded articles having excellent flex crack resistance were obtained from the resin compositions of all the Examples.

Example 9

Pellets of the resin composition of the invention were prepared in the same manner as in Example 1 except that a mixture of 7 weight parts of "TAFTEC H1041" (manufactured by Asahi Kasei Corporation, styrene/ethylene/butylene block copolymer (SEBS), melt viscosity: 1372 Pa·s (220° C., shear rate: 122 sec$^{-1}$)) and 3 weight parts of "TAFTEC H1141" (manufactured by Asahi Kasei Corporation, styrene/ethylene/butylene block copolymer (SEBS), melt viscosity: 157 Pa·s (220° C., shear rate: 122 sec$^{-1}$)) was used as the styrene-based thermoplastic elastomer (B) in Example 1, and a single layer film was similarly obtained and evaluation was similarly performed. The results were summarized in Table 3.

Incidentally, on this occasion, the melt viscosity of the mixture of the styrene-based thermoplastic elastomer (B) and the polyamide graft block copolymer (C1) at 220° C. and a shear rate of 122 sec$^{-1}$ was 1263 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 1.0.

Example 10

Pellets of the resin composition of the invention were prepared in the same manner as in Example 1 except that the amount of "TAFTEC H1041" was changed to 7.3 weight parts and the amount of "TAFTEC H1141" was changed to 2.7 weight parts in the styrene-based thermoplastic elastomer (B) in Example 9, and a single layer film was similarly obtained and evaluation was similarly performed. The results were summarized in Table 3.

Incidentally, on this occasion, the melt viscosity of the mixture of the styrene-based thermoplastic elastomer (B) and the polyamide graft block copolymer (C1) at 220° C. and a shear rate of 122 sec$^{-1}$ was 1387 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 0.92.

Example 11

Pellets of the resin composition of the invention were prepared in the same manner as in Example 1 except that "TAFTEC H1141" (manufactured by Asahi Kasei Corporation, styrene/ethylene/butylene block copolymer (SEBS), melt viscosity: 157 Pa·s (220° C., shear rate: 122 sec$^{-1}$)) was used as the styrene-based thermoplastic elastomer (B) in Example 1, and a single layer film was similarly obtained and evaluation was similarly performed. The results were summarized in Table 3.

Incidentally, on this occasion, the melt viscosity of the mixture of the styrene-based thermoplastic elastomer (B) and the polyamide graft block copolymer (C1) at 220° C. and a shear rate of 122 sec$^{-1}$ was 627 Pa·s. The ratio $\eta_A/\eta_{B+C}$ of the melt viscosity $\eta_A$ of the PVA resin (A) to the melt viscosity $\eta_{B+C}$ of the mixture of the styrene-based thermoplastic elastomer (B) and the polyamide graft block copolymer (C) was 2.0.

TABLE 3

| | Flex crack resistance (number of pinholes) |
|---|---|
| Example 1 | 45 |
| Example 9 | 38 |
| Example 10 | 39 |
| Example 11 | 78 |

In these Examples, the melt viscosity ratio of the PVA resin (A) to the mixture of the styrene-based thermoplastic elastomer (B) and the polyamide graft block copolymer (C) was adjusted by changing the styrene-based thermoplastic elastomer (B), and molded articles having excellent flex crack resistance were obtained from the resin compositions of all the Examples.

Example 12

Pellets of the resin composition of the invention were prepared in the same manner as in Example 9 except that the amount of the PVA resin (A1) was 70 weight parts, a mixture of 10.5 weight parts of "TAFTEC H1041" (manufactured by Asahi Kasei Corporation, styrene/ethylene/butylene block copolymer (SEBS), melt viscosity: 1372 Pa·s (220° C., shear rate: 122 sec'')) and 4.5 weight parts of "TAFTEC H1141" (manufactured by Asahi Kasei Corporation, styrene/ethylene/butylene block copolymer (SEBS), melt viscosity: 157 Pa·s (220° C., shear rate: 122 sec$^{-1}$)) was used as the styrene-based thermoplastic elastomer (B) in Example 9, and the amount of the polyamide graft block copolymer (C1) was 15 weight parts. Then, a single layer film was similarly obtained and oxygen permeability shown below was evaluated together with the flex crack resistance. The results were summarized in Table 4.

(Oxygen Permeability)

The oxygen permeability under the conditions of 23° C. and 65% RH was measured using an oxygen permeability tester ("Oxtran 2/20" manufactured by MOCON).

Example 13

Pellets of the resin composition of the invention were prepared in the same manner as in Example 9 except that the amount of the PVA resin (A1) was 60 weight parts, a mixture of 14 weight parts of "TAFTEC H1041" (manufactured by Asahi Kasei Corporation, styrene/ethylene/butylene block copolymer (SEBS), melt viscosity: 1372 Pa·s (220° C., shear rate: 122 sec$^{-1}$)) and 6 weight parts of "TAFTEC H1141" (manufactured by Asahi Kasei Corporation, styrene/ethylene/butylene block copolymer (SEBS), melt viscosity: 157 Pa·s (220° C., shear rate: 122 sec$^{-1}$)) was used as the styrene-based thermoplastic elastomer (B) in Example 9, and the amount of the polyamide graft block copolymer (C1) was 20 weight parts, and a single layer film was similarly obtained and evaluation was similarly performed. The results were summarized in Table 4.

TABLE 4

| | Flex crack resistance (number of pinholes) | Oxygen permeability (cc. 30 μm/m² · day) |
|---|---|---|
| Example 9 | 38 | 12.5 |
| Example 12 | 13 | 16.5 |
| Example 13 | 0.6 | 20.9 |

These are Examples in which the blend ratio of the PVA resin (A) to the mixture of the styrene-based thermoplastic elastomer (B) and the polyamide graft block copolymer (C) was changed. It was apparent that the flex crack resistance is improved but the oxygen barrier properties are lowered when the blend ratio of the PVA resin (A) is decreased.

Example 14

Pellets of the resin composition of the invention were prepared in the same manner as in Example 9 except that the PVA resin (A2) obtained in Production Example 2 was used as the PVA resin in Example 9, and a single layer film was similarly obtained and flex crack resistance and oxygen permeability were evaluated. The results were summarized in Table 5.

TABLE 5

| | Flex crack resistance (number of pinholes) | Oxygen permeability (cc. 30 μm / m² · day) |
|---|---|---|
| Example 9 | 38 | 12.5 |
| Example 14 | 21 | 37.8 |

These are Examples in which the influence of saponification degree of the PVA resin is investigated. One using the PVA resin (A) having a low saponification degree is excellent in flex crack resistance but is poor in oxygen barrier properties.

While the invention has been described in detail and with reference to specific embodiments thereof, it will be apparent to one skilled in the art that various changes and modifications can be made therein without departing from the spirit and scope thereof.

The present application is based on Japanese Patent Application No. 2010-171471 filed on Jul. 30, 2010, and the contents are incorporated herein by reference.

Industrial Applicability

Since the molded article obtained by melt-molding the resin composition of the present invention has both of excellent gas barrier properties and superior flex crack resistance, the article can be suitably used as films, sheets, and containers for packaging articles for which it is desired to avoid deterioration by oxidation, such as foods and pharmaceuticals, containers, tubes, and hoses for hydrogen gas for which high gas barrier properties and flexibility are required, and the like.

The invention claimed is:

1. A resin composition comprising a polyvinyl alcohol resin (A) having a 1,2-diol structural unit represented by the following formula (1), a styrene-based thermoplastic elastomer (B), and a polyamide graft block copolymer (C) containing a polymer block of an aromatic vinyl compound and a polymer block of an olefinic compound in a main chain and having a graft chain composed of a polyamide:

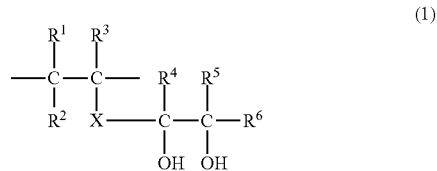

(1)

wherein each of $R^1$, $R^2$, and $R^3$ independently represents a hydrogen atom or an alkyl group having 1 to 4 carbon atoms, X represents a single bond, and each of $R^4$, $R^5$, and $R^6$ independently represents a hydrogen atom or an group having 1 to 4 carbon atoms, and wherein a content ratio (A)/{ (B)+(C) } of the polyvinyl alcohol resin (A) to the total of the styrene-based thermoplastic elastomer (B) and the polyamide graft block copolymer (C) is 95/5 to 50/50 as a weight ratio.

2. The resin composition according to claim 1, wherein a content ratio (B)/(C) of the styrene-based thermoplastic elastomer (B) to the polyamide graft block copolymer (C) is 80/20 to 2/98 as a weight ratio.

3. The resin composition according to claim 1, wherein a content of the polyamide component in the polyamide graft block copolymer (C) is 20 to 80 weight %.

4. The resin composition according to claim 1, wherein a ratio $\eta_A/\eta_{B+C}$ of melt viscosity $\eta_A$ of the polyvinyl resin copolymer (A) to melt viscosity $\eta_{B+C}$ of a mixture of the styrene-based thermoplastic elastomer (B) and the polyamide graft block copolymer (C) is 0.5 to 3, wherein the melt viscosities are measured at 220° C.

5. A molded article obtained by melt-molding the resin composition according to claim 1.

* * * * *